(12) United States Patent
Nangia

(10) Patent No.: US 8,438,993 B2
(45) Date of Patent: May 14, 2013

(54) PORTABLE, MULTI-ACCESS CONTAINER

(76) Inventor: Rishi Nangia, Washington, DC (US)

(*) Notice: Subject to any disclaimer, the term of this patent is extended or adjusted under 35 U.S.C. 154(b) by 89 days.

(21) Appl. No.: 12/626,275

(22) Filed: Nov. 25, 2009

(65) Prior Publication Data

US 2010/0300363 A1   Dec. 2, 2010

Related U.S. Application Data

(60) Provisional application No. 61/118,126, filed on Nov. 26, 2008.

(51) Int. Cl.
*A01K 5/01* (2006.01)
*B65D 6/40* (2006.01)

(52) U.S. Cl.
USPC ........ 119/61.56; 119/61.5; 220/661; 215/380

(58) Field of Classification Search .......... 119/51.01, 119/72, 61.1, 61.5, 61.56; 220/661; D7/507; 215/380, 385

See application file for complete search history.

(56) References Cited

U.S. PATENT DOCUMENTS

| | | | | |
|---|---|---|---|---|
| 3,490,501 A | * | 1/1970 | Lefebvre et al. ........... | 141/84 |
| 3,612,637 A | * | 10/1971 | Betts ........................ | 312/290 |
| 3,904,058 A | * | 9/1975 | Rosenstein ............... | 215/6 |
| 4,334,028 A | * | 6/1982 | Carver ..................... | 435/304.3 |
| 4,927,764 A | * | 5/1990 | Lyman et al. ............. | 435/304.3 |
| 5,310,676 A | * | 5/1994 | Johansson et al. ....... | 435/304.1 |
| D356,469 S | * | 3/1995 | Musilli et al. ............ | D7/507 |
| 5,738,039 A | * | 4/1998 | Berman et al. ........... | 119/77 |
| 5,810,194 A | | 9/1998 | Samsel | |
| 5,823,136 A | * | 10/1998 | Zarski ...................... | 119/61.56 |
| 5,947,056 A | * | 9/1999 | Zarski ...................... | 119/61.56 |
| 5,960,742 A | | 10/1999 | O'Rourke | |
| 6,019,244 A | | 2/2000 | Jones | |
| 6,067,935 A | * | 5/2000 | Rodes ...................... | 119/72 |
| 6,101,974 A | * | 8/2000 | Frohlich .................. | 119/51.5 |
| 6,237,800 B1 | | 5/2001 | Barrett | |
| 6,276,299 B1 | * | 8/2001 | Firstbrook .............. | 119/74 |
| 6,401,954 B1 | | 6/2002 | Gamble | |
| 6,718,912 B2 | | 4/2004 | Pappas | |
| 7,490,577 B2 | | 2/2009 | Stephanos | |

FOREIGN PATENT DOCUMENTS

DE    3139778 A1  *  4/1983

* cited by examiner

*Primary Examiner* — Kristen C Hayes
(74) *Attorney, Agent, or Firm* — Winston & Strawn LLP

(57) ABSTRACT

A container for storing or delivering a consumable liquid or semi-solid to an animal, such as a human or domesticated pet, includes a receptacle for holding its contents and two or more openings. At least one opening is an elongated opening formed in the side of the walls of the container to allow lapping or licking of the contents by the animal, when the container is laid on its side. The opening in the walls is covered by a corresponding cover, which is affixed using adhesives, mechanical devices, or a combination thereof. The cover prevents spilling of the contents when in place. The container is manufactured so that the opening in the walls can be opened by manually removing the cover, either partially or completely. The cover may be reattached to the container using a fastening technique or device.

24 Claims, 16 Drawing Sheets

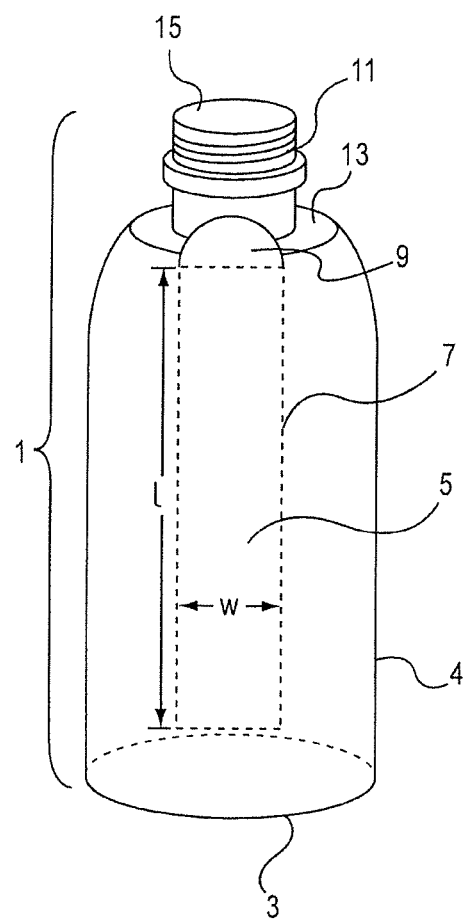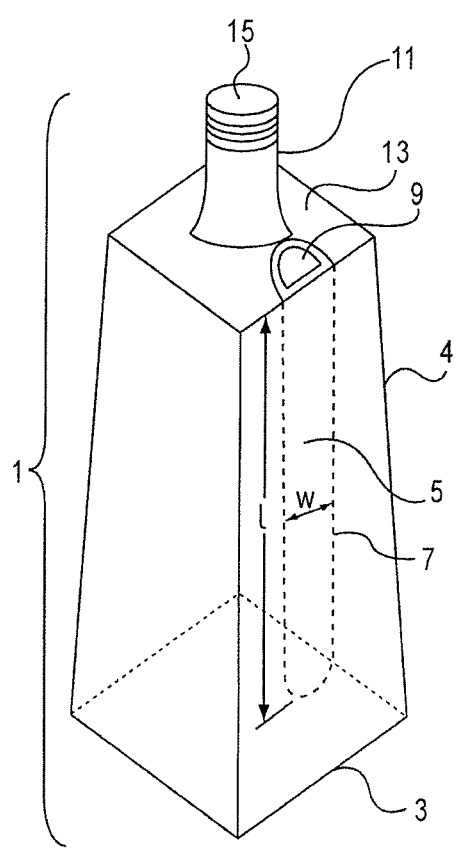

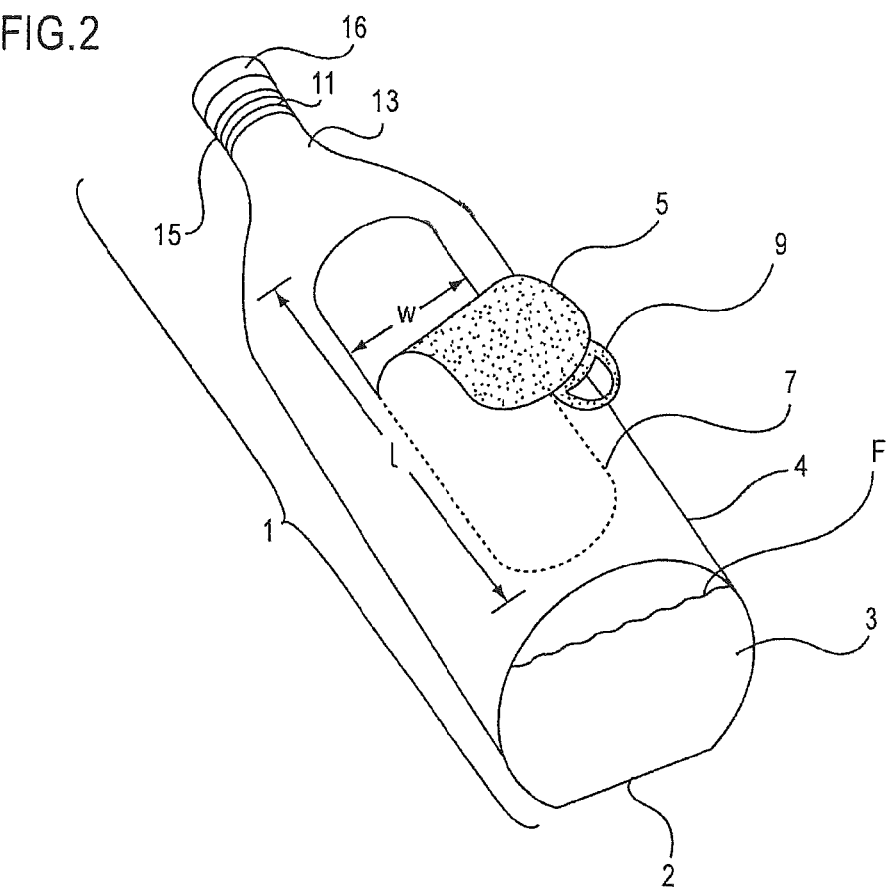

PORTABLE, MULTI-ACCESS CONTAINER

CROSS-REFERENCE TO RELATED APPLICATION

This application claims the benefit of U.S. Provisional Patent Application Ser. No. 61/118,126, filed on Nov. 26, 2008. The subject matter of this earlier filed application is hereby incorporated by reference.

FIELD OF THE INVENTION

The present invention relates to a portable container apparatus for storing and delivering consumable products, such as foods and potable liquids, semi-solids, and solids. More particularly, the invention relates to a multipurpose, portable container, which includes multiple access points for consumption or delivery of the contents therein.

BACKGROUND OF THE INVENTION

Pet ownership around the world, particularly in such countries as the United States and Australia, is highly prevalent. In the United States alone, there are approximately seventy-three million dogs owned as pets. Almost forty percent of U.S. households own at least one dog. Of pet owners in the U.S., sixty percent own one dog, twenty-five percent of owners own two dogs, and fourteen percent of owners own three or more dogs.

It is now more important than ever to provide pets with the highest level of care. Pet owners are also becoming increasingly aware of new and tested responsibilities involved with pet ownership and proper care of pets. It is recommended, for example, that owners provide their pets with a well-balanced diet, as well as plenty of water. In fact, many believe that the provision of food and water care for dogs and other animal pets has approached the same diligence as applied to human family members.

Ironically, as the responsibilities of pet care increase, owners seemingly have less and less time to tend to the needs of their pets. Accordingly, there is a need in the art for quick, efficient, convenient, and/or simple methods and devices for taking care of pets or tending to their needs. These methods and devices should ideally blend into the owners' daily routine, thereby increasing the chances that the owners will comply, and in turn, provide high-quality care to their pets.

As with any living organism, pets, such as dogs, rely on water on a daily basis to live. Busy owners have traditionally tended to meet their pet's needs by serving water (and other consumable liquids) in bowls or standing dishes. Unfortunately, standing water is often subject to contamination, such as by microorganisms and/or other environmental factors, including chemicals or particulates. Moreover, standing water is not suitable for owners and pets, who are "on-the-go," such as when pets accompany their owners during exercise, such as walks and hikes, and other activities such as shopping, that may cause physical exertion and/or dehydration in the pet owner, pet, or both. Often these activities take place in locations having limited access to drinking facilities or locations that are not close enough to return home quickly. In many cases, even if water is available, it is may not be physically accessible or cannot be given to the pet because of social constraints or socially accepted etiquette.

The conventional art includes several methods and devices to provide pets with portable water solution, particularly when the owners and/or pets are not able to access standing water in bowls and/or are not stationary in one place for long periods. One common method to provide pets water while on-the-go is pouring water into human hands and allowing the water to be lapped (i.e., take in a liquid or food with the tongue) by the pet. This method may not only be unhygienic, but is often inefficient. That is, most of the water "cupped" in the hand is inadvertently spilled, resulting in very little water uptake by the animal.

The prior art includes many devices that require the pet owner to carry additional pieces along with the water supply, e.g., water bottle, making it cumbersome and inconvenient for the owner. Thus, there is a level of inconvenience because owners have to carry multiple parts and assembly of the parts may be complicated or take extra time. Such devices are provided in U.S. Pat. Nos. 6,401,954, 6,718,912, 6,237,800, 6,019,244, 5,960,742, and 5,810,194, for example. These devices fail to provide a suitable apparatus for serving the consumable substance, e.g., food or water, which is integrated with a fully portable container.

In U.S. Patent Publication No. 2007/0079762, the inventors disclose a portable drinking device for pets adapted to be used with a conventionally-shaped, water bottle, wherein the device includes a lapping pan and a clip assembly for carrying the water bottle. The invention provides an adequate structure to promote lapping and efficient consumption of the water by the pet. This device, however, is notably inconvenient because the pet owner must always remember to carry this device to attach to, and complement, the water bottle. That is, the invention is a separate device to be used in addition to the water delivery apparatus, i.e., a bottle. Even if such a device were to be integrated with the bottle, it would add significant manufacturing expense and far more cumbersome design, which would like make it less efficient to store.

U.S. Pat. No. 6,237,800 discloses a dual-purpose water bottle having a cylindrical shape and having a perpendicularly disposed dividing wall roughly half-way down the cylindrical shape. One end of the water bottle includes an openable and detachable drinking spout, and the opposite end includes a roller ball drinking mechanism, which is intended for use by dogs. The roller ball, however, does not allow the animal to lap water in a manner similar to a dog bowl. It is undesirable to provide a receptacle or method unfamiliar to the dog or other pet.

It is desirable to have a portable device for consumption of substances, such as food or fluids by an animal, such as a pet, that is convenient, efficient, and multipurpose. Consumers seek a convenient way of ensuring that their pets receive adequate care, particularly adequate hydration. A desired device should allow pet owners to feed consumables (liquids, semi-solids, and/or solids) to their pets to avoid dehydration of the pet and/or maintain the general health of the pet. Accordingly, it is desirable to give a consumer on a walk with a dog, for example, the ability to purchase a water bottle from a convenient store, drink from the conventional opening, and then provide a remaining amount of water in the bottle to his/her dog by closing the conventional top and providing lapping access through a secondary opening. Such a bottle should preferably have a conventional configuration for the overall size and shape so as to comply with conventional storage standards and devices, such as water crates and cup holders and to provide pet owners and pets with a familiar look and feel. The bottle should also limit the number of supplementary parts that must be used in conjunction with the bottle by integrating the secondary opening within the structure of the bottle.

There is an unmet need to remedy the deficiencies of the prior art by providing a portable drinking solution for animals, particularly pets, which does not require the pet owner to use or carry any supplemental device or apparatus. There is also a need in the art for an apparatus for efficiently and hygienically providing drinking fluids to animals.

SUMMARY OF THE INVENTION

Aspects of the invention meet the unmet needs in the art by providing a container for storing and/or delivering a consumable product, the container having a base portion; a surrounding wall connected to the base portion; an aperture, preferably elongated, formed in the surrounding wall; and a removable cover configured to engage the container to close the elongated aperture (interchangeably referred to herein as "secondary," "side," or "lapping" opening or aperture) and to retain the consumable product within the container.

In preferred embodiments the containers has a generally cylindrical shape, often commonly referred to or known as a "bottle" or "can." The container is not limited to a cylindrical structure; it may take any shape as long as it can hold contents therein. The container further includes a top portion having a conventional opening, and typically a corresponding conventional removable cap configured mate with the conventional opening to seal the top portion of the container. This conventional opening and corresponding cap is a standard feature found in most drinking bottles. The preferably elongated aperture may be so dimensioned to allow lapping access by an animal or manual access by an animal, such as a primate or human. The elongated opening may be substantially larger than the conventional opening. The cover may be integrated with the surrounding wall or may be disposed on top or below the surrounding wall so as to generally fit matingly, and preferably snugly, against the surrounding wall, preferably creating a seamless and/or seal-tight bond therewith.

The attachment to and retention of the cover on the bottle would be understood by one skilled in the art. For example, the container may include any of the following: an adhesive between the cover and the portion of the surrounding wall surrounding the elongated aperture; a rip tab or pull tab to facilitate pulling of the cover; a gasket (which may generally be referred to as an "elastomeric member") between the cover and the surrounding wall preferably composed of rubber, plastic or the like to create a watertight seal (or substantially water tight seal); a sleeve or a removable outer shell that can be placed around the bottle such as to encapsulate the bottle; perforations preferably integrated into surrounding walls of the container surrounding the aperture; and/or corresponding snapping or locking members on or in the cover and the surrounding wall.

The surrounding wall may include a plurality of sidewalls, forming an enclosed chamber for retaining contents therein. Preferably, the walls define the shape of the bottle. The elongated aperture is formed in one of the sidewalls. The container may also include a plurality of at least partial perforations extending into at least one adjacent sidewall such that the elongated aperture can be extended by pulling the sidewall along the at least partial perforations, thereby creating a larger elongated aperture. The surrounding sidewall may have a circular cross-section, and further include a support element opposite the elongated aperture for supporting the container in a position facing the elongated aperture upward.

In other embodiments of the present invention, the container of the present invention generally has a shape, such as a bottle or a can, for holding liquid or semi-solid contents therein. The container includes at least a base and walls formed with the base, defining a hollow chamber to be used as a receptacle for a liquid or semi-solid substances, a first opening disposed at the distal end from the base, and a second opening formed in the walls, wherein the secondary opening has a larger area than the first opening to allow lapping of the liquid or semi-solid contents therein by an animal. In preferred embodiments, the container further includes a removable cover so dimensioned to fit over the secondary opening to prevent spilling of the liquid or semi-solid from the container. In preferred embodiments, the area of the secondary opening is 1000 times larger than the area of the conventional opening. In other embodiments, the area of the secondary opening is 200 times, preferably 100 times, even more preferably 50 times or 25 times, the area of the conventional opening.

In embodiments in which the bottle is reusable, the cover is also reusable, meaning it can be removed and reinstated to reseal the secondary opening. In some embodiments, the walls of the container have a thickness, allowing for at least an outer layer and an inner layer of the walls. In these embodiments, the container includes an outer layer of the walls from which the secondary opening is formed and an inner layer of walls in immediate contact with the outer layer of walls, wherein the inner layer extends in the area of the secondary opening, forming a lip circumscribing the perimeter of the secondary opening, wherein the removable cover attaches to the lip to form a seal of the secondary opening.

Aspects of the present invention meet the unmet needs in the art by providing a method for providing dual access to a container. The method may include providing a container having a first conventional opening and a second opening and accessing at least two openings to access the contents therein. In preferred embodiments methods may include removing and/or replacing the cover covering the second aperture. The container and second opening may include features similar to those discussed above for the container and elongated opening.

Aspects of any of the embodiments illustrated above and below may stand independently or features may be combined to achieve additional embodiments. Additional advantages and novel features of aspects of the present invention will be set forth in part in the description that follows, and in part will become more apparent to those skilled in the art upon examination of the following or upon learning by practice thereof.

BRIEF DESCRIPTION OF THE DRAWINGS

Other features and advantages of the invention will become apparent from the description that will now be given, with reference to the appended figures, which show, by way of example but implying no limitation, possible aspects of embodiments of the invention.

FIG. 1A illustrates a portable container having multiple openings and a substantially round, cross-sectional shape, in accordance with aspects of an embodiment of the present invention;

FIG. 1B illustrates a portable container having multiple openings and a substantially square or rectangular, cross-sectional shape, in accordance with aspects of an embodiment of the present invention;

FIG. 2 provides an isometric view of a portable container having multiple openings in which the cover on the aperture integrated in the longitudinal walls is partially removed, in accordance with aspects of an embodiment of the present invention;

DETAILED DESCRIPTION OF THE PREFERRED EMBODIMENTS

Figure 3:
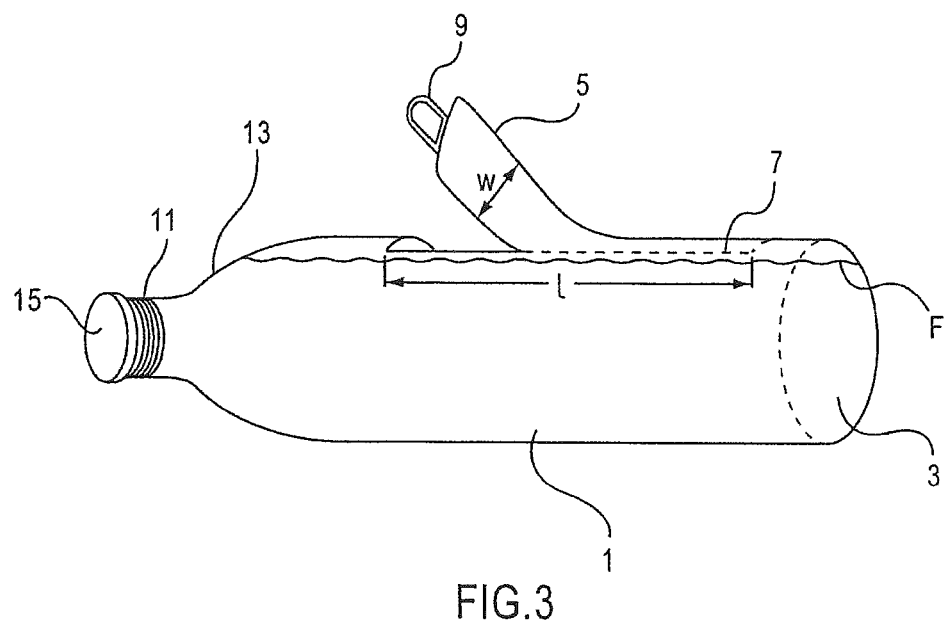
FIG. 3 illustrates an exemplary view of a portable container having multiple openings in which the container is disposed horizontally and the cover on the aperture integrated in the longitudinal walls is partially removed, in accordance with aspects of an embodiment of the present invention.

Aspects of the present invention include a multi-purpose container for consumable substances that is suitable for use by animals, including humans and preferably pets, such as mammals, including dogs and cats or more preferably any animal that can lick or lap food or liquids. More specifically, aspects of embodiments of the container improve upon traditional beverage containers, such as bottles, which conventionally only have one opening disposed at the top of the container. Among other things, embodiments of the container disclosed herein may include one or more openings, disposed on the side (i.e., "longitudinal walls," "surrounding walls" or "walls") of the bottle, in addition to the conventional opening. In preferred embodiments, the additional opening may have an area larger than the conventional opening, preferably large enough to allow a pet to lap the substance (also referred to as "contents," "material," or "consumable"), e.g., a fluid or beverage, such as water or electrolytic solution, from the container when the container is placed on its side, preferably with the secondary opening facing up, or substantially facing up, so as to retain the contents therein without spilling outside of the container and provide access to the container to animal positioned above the container.

Although the secondary aperture is described as a "secondary" aperture throughout this specification, embodiments of the present invention may include a container having only this aperture. Accordingly, the term "secondary" aperture is only used for clarity in distinguishing the aperture from the conventional opening 15 in some embodiments.

With the advent of aspects of embodiments of this container, pet owners, who are on-the-go, may purchase or use a water bottle that uses the configurations disclosed in certain embodiments herein for their consumption and animal consumption from a single outlet or store. That is, the unique configuration of the container allows a user the option of consuming the contents of the container using the conventional method through the top opening (i.e., unscrewing the top of the bottle or opening the top of a beverage can), and/or using the secondary opening on the side of the container to access its contents (allowing an animal to lap contents through the secondary opening). Among its many uses, the container disclosed herein meets the long-felt need of pet owners to have a bottle suitable for pet use that is economical, convenient, efficient, widely available, and multi-purpose. Additionally, the container provides a method of delivering consumables to a pet without the need for supplemental supplies, additional supplies, or pet aids to access the contents within the container.

As used herein, a "consumable substance" or "consumable" includes any food, liquid, or combination thereof. The liquid is preferably potable. For example, a "liquid" may include a hot or cold fluid, such as water, electrolytic solution (e.g., a sport drink), juice, soup, or other beverage. Food may include cereal, snack food, or any substance suitable in wet and/or dry form suitable for oral delivery and preferably for digestion by the animal. A semi-liquid includes any substance that contains a liquid with any portion of solid. Practical embodiments of semi-solids may include certain soups, chili, or food, including food intended for pets, in water, oil or gravy.

As used herein, the term "animal," "user," "subject," or "intended" includes a human and/or pets, preferably in captivity and more preferably domesticated, including, for example, mammals, such as dogs, cats, pigs, hamsters, and guinea pigs, birds, and reptiles. In the most preferred embodiments, animals as referred to herein include dogs, cats or similar animals, which can access the contents through the secondary opening by lapping or licking, and humans, who can primarily access the secondary aperture via hands and tools, such as utensils.

As used herein, a "container," according to the present invention, is shaped and configured to hold contents such as conventional beverage containers such as a metal can, paper (e.g., cardboard) cartons, plastic jugs, and bottles, all of which are commonly used for juice, milk, water, sodas, and other fluids, for example. More preferably, the container of the present invention is based on a traditional bottle-shape, beverage-holding receptacle that includes a base integrally formed with longitudinal walls, typically forming a circular, ovular, elliptical, rectangular, trapezoidal, triangular, square or combination thereof cross-sectional shape. Accordingly and preferably, the shape of the bottle is substantially cylindrical, or rectangular, or some combination of the two shapes. The container may be disposable particularly in embodiments in which parts, such as the cover, can be permanently removed without the ability to reseal the container. Certain embodiments contemplate the use of nondisposable containers, such as those traditionally made using glass, metal, reusable plastic, or a combination thereof.

Aspects of preferred embodiments may include longitudinal walls that converge distal to the base to form a neck and a traditional bottle opening, which matingly corresponds with a removable top forming a preferably leak proof seal when in place. In certain embodiments, the bottle may also include a threaded portion on the neck that allows for the use of screw-on, screw-off caps, or caps with an open/close feature wherein the cap is mateable with the walls forming the walls surrounding the aperture. Certain preferred bottles may further include a flange at the bottom of the threaded portion.

For convenience, the terms "containers" and "bottle" are used interchangeably herein. The illustrations and descriptions of the container as used herein refer to the traditional bottle shape. It should be understood that the present invention is not limited to the bottle shape, but uses a bottle-shape representation as exemplary of the other containers of consumable substances, such as food and beverages.

The container is constructed from materials that are leak-proof or substantially leak-proof. In preferred embodiments, the container can hold and retain liquid within its chambers. In embodiments, the materials are semi-rigid to rigid. Moreover, in embodiments, the containers may be constructed from any materials, such as metal, including tin, aluminum and alloys, glass, cardboard or other paper product (such as cartons), various plastics, or combinations thereof. Suitable materials may include copolyesters, thermoplastic polymer resins of the polyester family, polycarbonates, high-density and low-density polyethylene among others. In preferred embodiments, the container is constructed from plastics, preferably non-leaching, used for conventional beverage containers, such as polyethylene terephthalate (PET or PETE) or combinations or variations thereof. Moreover, bottles marketed under the following exemplary trade names would also be suitable for the present invention: Arnite®, Impet®, Rynite®, Ertalyte®, Hostaphan®, Melinex®, Mylar®, Dacron®, Diolen®, Terylene®, and Trevira®. Among other factors, the material may be selected depending on whether the container is intended to be disposable or reusable. Conventional reusable containers, such as containers by Nalgene®/ThermoFisher (Rochester, N.Y.) or Sigg® (Switzerland), may be adapted to implement the technology of this invention. Preferably the container is lightweight, and the thickness of the materials would be determined by one skilled in the art based on the characteristics of the contents of the container.

The manufacture of certain plastic or plastic-based containers disclosed herein is also understood by one skilled in the art, and may include various molding processes, injection blow molding, extrusion blow molding, stretch blow molding, or a combination thereof, for example. Metal containers may be die-cast. Manufacture of the container would be understood by one skilled in the art, and is preferably in accordance with manufacturing standards or in accordance with regulations related to bottles or containers intended for human or animal use.

The cover on the second opening on the container is constructed from the materials that are the same or different from the materials of the container itself. The cover is leak-proof or substantially leak-proof. The cover may be rigid or semi-rigid. In some embodiments, particularly in which the cover may be used to hold the bottle in place, the cover is preferably constructed from a pliable material that may be manually manipulated by a human. In more preferred embodiments, the cover, and the cover-container border, include design and manufacturing features, such as scored surfaces, that facilitate manual manipulation and retention of the manipulated shape. The cover may include a shape or appendages that facilitate user manipulation, such as opening or closing of the cover or locking the cover to the longitudinal walls for portability of the container.

Figure 12:
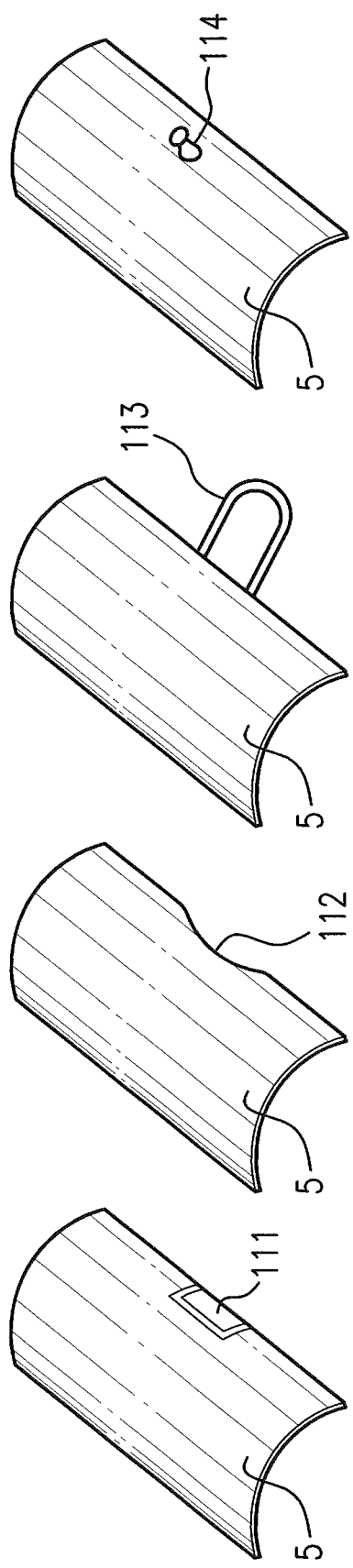
FIG. 12A illustrates an exemplary representation of a cover having a hook locking mechanism, in accordance with aspects of an embodiment of the present invention.
FIG. 12B illustrates an exemplary representation of a cover having a raised indented shape, in accordance with aspects of an embodiment of the present invention.
FIG. 12C illustrates an exemplary representation of a cover having a pullable tab, in accordance with aspects of an embodiment of the present invention.
FIG. 12D illustrates an exemplary representation of a cover having a knob-like mechanism, in accordance with aspects of an embodiment of the present invention.

FIGS. 12A-D provide additional embodiments of cover shapes and functionality. In FIG. 12A, the cover 5 includes a receiving member 111, which matingly corresponds to a locking member (not shown). In FIG. 12B, the cover 5 includes a raised ridge 112, allowing manual manipulation. In FIG. 12C, the cover 5 includes a pullable tab 113. In FIG. 12D, the cover 5 includes a knob 114, which has dimensions based on the aesthetic preference or based on functional aspects such as ease of use and storage of the bottle. It would be understood to one skilled in the art that the covers and features show in FIGS. 12A-D are merely exemplary. Features such as knobs and tabs, for example, may be placed anywhere on the cover such that the functional aspects remain intact.

In at least one embodiment, the cover is a threaded screw or snap cap that affixes to corresponding wall (e.g., secondary aperture edge) on the container to cover the secondary aperture. In one variation, the edges of the bottle at the secondary aperture are raised from the surface of the bottle walls. The raised portion of the walls is preferably threaded or equipped with a snap fit feature to fit matingly with a corresponding cover. In some embodiments, to facilitate a "screw" system, the elongated opening is substantially circular.

In certain preferred embodiments, the area of the secondary aperture is greater than the size of the conventional opening. Typically the conventional opening is configured for human sipping, sucking, or drinking, and is coverable or substantially by the size of a human mouth. Embodiments of the container provide access to the contents to animals that would otherwise be unable to access, impeded from access, or have inefficient access to the contents through the conventional opening. In embodiments, the size ratio of the secondary aperture 7 to the conventional opening is greater than 1:1, preferably 1.5:1 or more, more preferably 2:1 or more, even more preferably 4:1 or more, yet more preferably 7:1 or more, and most preferably 10:1 or more. In preferred embodiments, the area of the secondary opening is 1000 times larger than the area of the conventional opening. In other embodiments, the area of the secondary opening is 200 times, preferably 100 times, even more preferably 50 times or 25 times, the area of the conventional opening. In other preferred embodiments, the area of the secondary aperture is between about 1 to about 200 times the size of the area of the conventional opening.

The secondary aperture may take any shape. In one embodiment, the aperture is elongated, such as ovular or rectangular, with or without rounded edges in some embodiments. The secondary aperture is of any shape so long as the animal has lapping or licking access. For example, the secondary aperture may be circular in shape so long as the diameter of the circle allows the animal to access the contents through the secondary aperture.

In conventional bottles and cans, the size of the conventional opening is generally constant or substantially constant regardless of the size of the bottle itself. Accordingly, in yet additional embodiments, the area, size, and dimensions of the secondary aperture are variable. In some embodiments, the area of the secondary aperture is large enough for an animal, such as a dog, to lap the contents therein, but small enough to retain, or substantially retain, the quantity of consumable substance in the container without spilling the substance over wall and outside the container.

The size of the secondary aperture is adjustable, for example, dependent, in part, on the size of the container, the type and amount of consumable substance contained therein, the physical characteristics of the intended user of the secondary aperture, any limitations in manufacturing or storage, or a combination thereof. In preferred embodiments, the dimensions, i.e., the area, of the secondary aperture are greater than the size of the conventional opening.

The size of the secondary aperture may correspond to the intended use of the bottle, i.e., the animal that is the intended user. It is fully contemplated by the inventor that the dimensions of the secondary aperture may vary as a function of the intended animal using the container. In certain embodiments, a container may be designed with a specific animal or animals in mind. Accordingly, it would also be understood to one in the art that the size of the secondary aperture may be adjusted according to the physical characteristics of the intended animal. In preferred embodiments, the area of the secondary aperture is suitable for lapping of the contents therein by a pet, such as a dog or cat. A preferred commercial embodiment of the present invention includes a bottle having a secondary aperture for the largest dogs, thereby inherently being accessible by smaller dogs and cats. In certain embodiments that provide consumable substances for human consumption, the aperture is sufficiently sized to allow the functional use of utensils or the use of human hands in the aperture. In some embodiments, the aperture is sufficiently large to allow output, preferably unimpeded, of the contents therein. For example, if the container includes potato chips, the container aperture is preferably at least as large as the largest chip, and preferably as large as need to allow a human hand to reach in the container and pull out one or more chips.

The area of the aperture may also be dependent on the amount of consumable substances in the container. In preferred embodiments, the area of the aperture is such that spilling, leaking, and/or overflow is prevented or substantially prevented. It would be understood to one in the art that liquid consumable substances are more likely to leak or spill out unless the aperture is small enough to permit the longitudinal walls to be sized to be able to retain the fluid.

In a container having a square, rectangular, or square cross-section, maximum area of the aperture is defined by at least one full longitudinal wall and two partial longitudinal walls, thereby forming a receptacle chamber for the contents of the container when the cover is removed. While the invention discloses that an aperture may have an area greater than one longitudinal wall, as within the scope of this invention, preferred embodiments of the invention include an aperture that has an area equal to or less than the area of one longitudinal wall. An aperture having an area greater than this size may unduly and/or inefficiently limit the amount of liquid that may be stored in the container. That is in some applications, having a cover over the secondary aperture of an area greater than one longitudinal wall would likely lead to spilling of the liquid when removing the cover, unless the contents therein were present at significantly reduced levels.

The outer edges of the cover, which preferably correspond to the perimeter or circumference of the secondary aperture in preferred embodiments, may be defined at its edges by at least partial perforations or scoring. That is, when the cover is attached to the bottle, the boundary of the cover-bottle is defined by scoring or predetermined markings. The scoring, as would be known in the art, facilitates removal of cover by tearing, grabbing and pulling, for example. In some embodiments, the location of the integration, i.e., the circumference of the secondary opening and the cover, is characterized by less tensile strength than the rest of the bottle structure, thereby allowing the cover to be removed along predetermined markings (e.g., the secondary aperture edge) using the appropriate pressure, force, manipulation, or a combination thereof.

It would be understood to one skilled in the art to increase the safety of the container at the edges where the cover is removed by reducing or preferably removing jagged or serrated edges. In one embodiment, the bottle includes a smooth edge after tearing. In another embodiment, the container includes a smooth-edge lip, which may be disposed on a layer below the surrounding wall. In this embodiment, the lip extends into the aperture beyond the jagged edge of where the cover was removed, forming the circumference of the aperture. In certain embodiments, the circumference of the aperture is less than that of cover in this embodiment, allowing the cover to rest on the lip and therefore cover the aperture.

Figure 8:
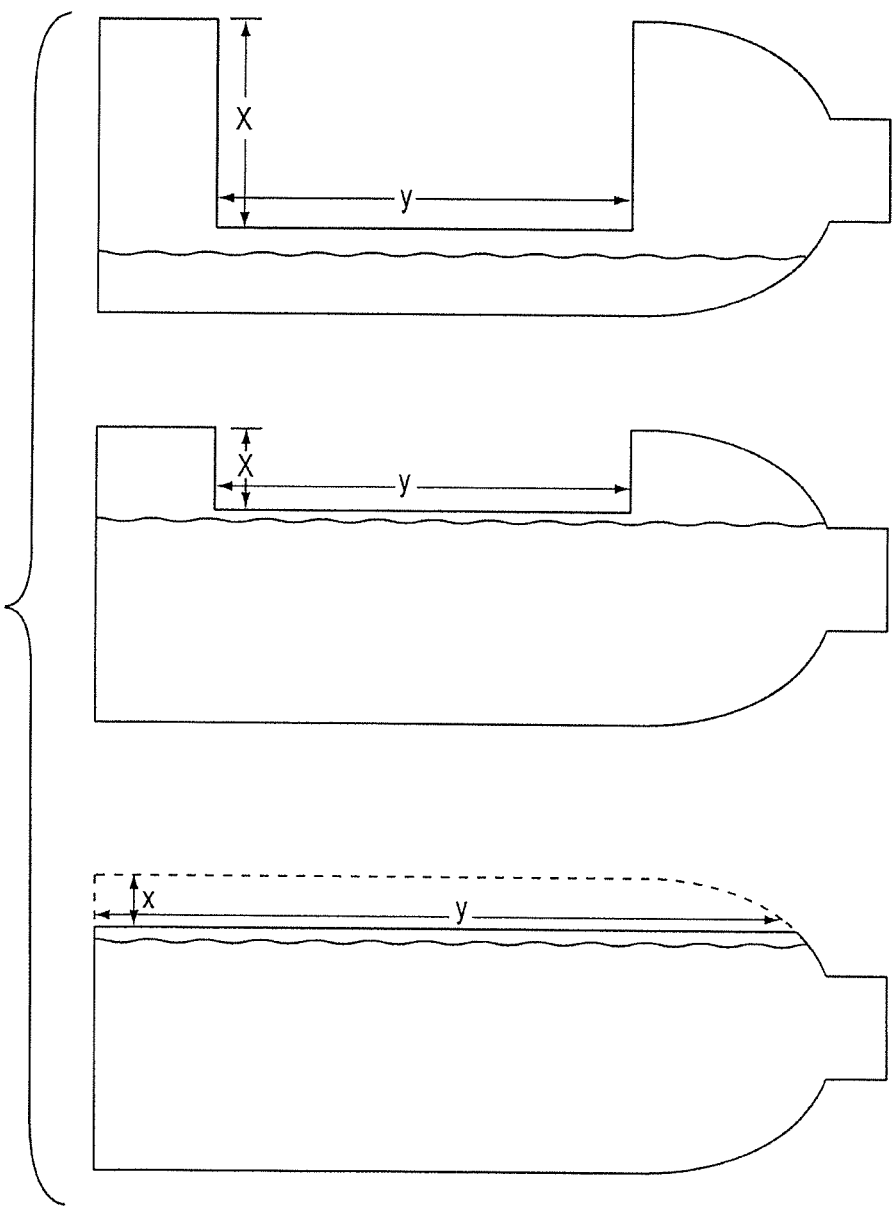
FIG. 8 illustrates multiple, exemplary representations of the secondary opening in which the dimensions of the secondary opening are varied to illustrate by example that the area of the secondary opening is adjustable, in accordance with aspects of an embodiment of the present invention.

FIG. 8 provides exemplary illustrations of a variably-sized secondary opening 7 in multiple representative containers 1. As can be seen in each depiction, the opening 7 may be any size so long as walls 4 exist in the bottle 1 structure. The walls 4 retain the liquid in the bottle 1. The opening 7 should be sized so that an amount of liquid is maintained within the bottle 1 and do not flow over the walls 4. Thus, if only a small amount (e.g., 1 ounce or less) of water is in the bottle 1, having a capacity of 32 ounces, the opening can be relatively large, as shown in FIG. 8. The x variable may be maximized. In. FIG. 8, x and y vary, and are dependent on the design of the bottle and how much of the contents are desired to be retained. As shown in FIG. 8, the length y of the opening of aperture 7 can be any length. The width x of the aperture may cross an entire wall, and extend a distance x into a second wall. The width x can be any width. Similarly, for containers having a circular cross section, the length y and circumferential width x can be any length.

In one exemplary embodiment, in a bottle containing 16 ounces of liquid, the aperture is preferably sized so that the 16 ounces of liquid are retained in the bottle when bottle is disposed with the secondary aperture opened and facing up for lapping purposes. In other preferred embodiments, the secondary aperture is sized so that the bottle retains an amount of liquid between about 64 ounces and about zero ounces, and preferably about 32 ounces and about zero ounces or preferably about 16 ounces and about zero ounces.

The containers of the present invention may be of any suitable size to hold consumable substances and to provide lapping access to animals of various sizes. Sizes of typical and exemplary bottles include 0.5 liters, 1 liter, 1.5 liters or 2 liters, and 8 ounces, 10 ounces, 16 ounces, 16.9 ounces, 20 ounces, 24 ounces, 32 ounces and 64 ounces. In some instances, the size of the bottles may range from about 1 ounce to about 120 ounces, preferably from about 6 ounces to about 64 ounces, more preferably from about 10 ounces to about 40 ounces, and preferably from about 16 ounces to about 32 ounces.

In some embodiments, the container may have an elastomeric member, such as a rubber or rubber-like gasket between the cover and the secondary aperture to form a water proof seal. The gasket may be affixed or integrated with either the cover or the container. The side not affixed should allow either the cover or container to fit snugly, thereby preventing leakage. In some embodiments, rubber on the cover may interlock or generally mate with rubber on the secondary aperture edge. The rubber is held in place by friction or adhesive preferably.

In other embodiments, aspects of present invention provide adjustably-sized longitudinal walls to facilitate access to even a small amount of material in a larger container. That is, as the stored material is consumed and its level is reduced, it may be desirable to provide further access to the remaining levels of material in the container especially for animals without the ability to reach the container. Thus, for a square container, the opening of the aperture 7 can be formed in more than one wall of the container.

In other embodiments, although the opening of aperture may be preformed to a particular size, the aperture may also be designed to allow the opening to be enlarged during use. For example, the container may include at least partial perforations or scoring, preferably prefabricated by the manufacturer, which allows the surrounding wall of the container to be opened further as the material in the container is consumed. One possible application is to allow an animal to lap a liquid from a bottle. Initially, the secondary opening may provide lapping access to an upper portion of the liquid. As the animal consumes the liquid, and the level of the liquid decreases, the sides of the aperture may be ripped down further to provide lapping access to the lower portions of the bottle. In some cases, the ripping down may be incremental, in amounts proportional to the prefabricated, rippable pieces. In certain embodiments, additional pieces of the wall may be removed piece-by-piece, as needed, preferably to access the contents in the bottle. For example, to reach the last remaining bit of liquid, for example, a human may rip the longitudinal wall, such that the height of the wall, which is y, is maintained to be only slightly above than the level of the material in the bottle.

In containers having circular, ovular, or substantially circular or ovular cross-sectional shapes, the area of the aperture is larger than the area of the conventional opening, and more preferably sufficiently large to allow lapping by an animal. In certain embodiments, the area of the aperture is limited by the amount of consumable substance in the container and the position of the container when the aperture uncovered. Thus, if the container is positioned with the longitudinal walls parallel to the surface, and the aperture is substantially disposed facing upwards, the longitudinal walls must enclose the consumable substance containing therebetween. It would be understood by one in the art how much consumable substance may be retained in containers having various size apertures.

A container having a substantially rectangular, trapezoidal, square or triangular cross-sectional shape, or a cross-sectional shape with at least one flat side 2, as shown in FIG. 2, may be placed on a flat side when in the horizontal position.

As shown in FIG. 1A, an exemplary container is represented by bottle 1, which includes a base 3 and longitudinal walls 4, forming a substantially circular, cross-sectional shape. FIG. 1B illustrates an alternative representation of the container, wherein the bottle 1 has a square cross-section. In both FIGS. 1A and 1B, the longitudinal walls 4 converge at or around a neck 13, and the neck 13 includes a first opening 15 (also referred to as a "conventional aperture" or "conventional opening"), which allows release of the contents of the container 1 for drinking, pouring, and/or otherwise dispensing the consumable substance in the container 1. The neck 13 may include a thread 11 that matingly corresponds to threads in a removable top or cap 16, as shown in FIG. 2, to provide a seal, preferably a leak proof seal, across the first opening 15.

In the embodiments shown in FIGS. 1A and 1B, a secondary opening 7 (i.e., "secondary aperture" or "aperture"), which has width $\omega$ and length $\iota$, is formed in the longitudinal walls/wall 4 of the bottle 1. In embodiments represented in FIGS. 1A and 1B, a removable cover 5 is matingly and correspondingly integrated with the longitudinal walls 4 and has width at least $\omega$ and length at least $\iota$. In preferred embodiments, the cover 5 is so dimensioned so as to fully cover the secondary opening 7 to keep the contents of the bottle 1 inside the bottle 1. In preferred embodiments, the cover 5 is made of the same or substantially similar material as the bottle 1. In some embodiments, the cover 5 comprises a material that maintains or helps maintain the integrity of the bottle 1, keeps the fluids in the bottle 1, and is removable using manual manipulation by a user. Aspects of the invention may further include a cover 5 that is resealable and may be used to access the contents inside of the bottle 1 a plurality of times. In preferred embodiments, the cover 5 is resistant or substantially resistant to puncture in the same manner as the material of the bottle 1. In other embodiments, the material of the cover 5 is one known in the art to the seal in the contents of the bottle 1 when mechanically integrated or engaged with the bottle 1. In some embodiments, the cover 5 is integrated with the bottle 1 such that the longitudinal walls 4 of the bottle 1 are substantially flush with the cover 5, thereby creating a smooth surface. In other embodiments the covers may sit on top of or below the longitudinal wall 4 and need not create a smooth-to-the-touch junction with the longitudinal wall 4.

As shown in FIGS. 1A, 1B, and 2, for example, the cover 5 may optionally include a manipulable facilitator 9 (e.g., a pull tab, rip tab, knob, or a handle) that provides a user, i.e., a human, with something to grasp to remove the cover 5. In some embodiments, the facilitator may also function as or in conjunction with a locking member. It should be understood to one skilled in the art, that the facilitator 9 may be disposed anywhere in connection with the removable cover 5 so as to allow the cover to be removed by firmly grasping the facilitator 9 and pulling in a direction substantially away from the bottle 1. Among other placements, a facilitator may be placed, for example, on any side of the cover, near the base of the container, or at a corner of the cover. In FIGS. 2 and 3, the exemplary cover 5 and the facilitator 9 are illustrated in a partially removed position. In FIGS. 2 and 3, the fill line F is shown on the base 3. In this representation the facilitator 9 may be pulled towards the base 3, away from the longitudinal walls 4, or a combination thereof, to remove the cover 5 from the bottle 1, thereby exposing or allowing access to the secondary aperture 7. The facilitator 9 may take any size, shape or position that facilitates a user in moving the cover 5 to access the secondary opening 7.

Among other placements, when the cover 5 is in place over the secondary aperture 7, the facilitator 9, as shown in FIGS. 1A, 1B, 2, and 3, may be preferably positioned flush against the neck 13 of the bottle 1, which allows for convenient and conventional storage and shipping of the bottle, for example. In certain embodiments, the facilitator 9 is adhesively affixed to the neck 13. Accordingly, in this embodiment, grasping of the facilitator 9 requires a user to first lift the affixed facilitator 9 away from the neck 13, prior to manipulating the facilitator 9 to remove the cover 5. In other embodiments, the facilitator 9 may extend in a plane radial to the neck 13 of the bottle 1.

Figure 4:
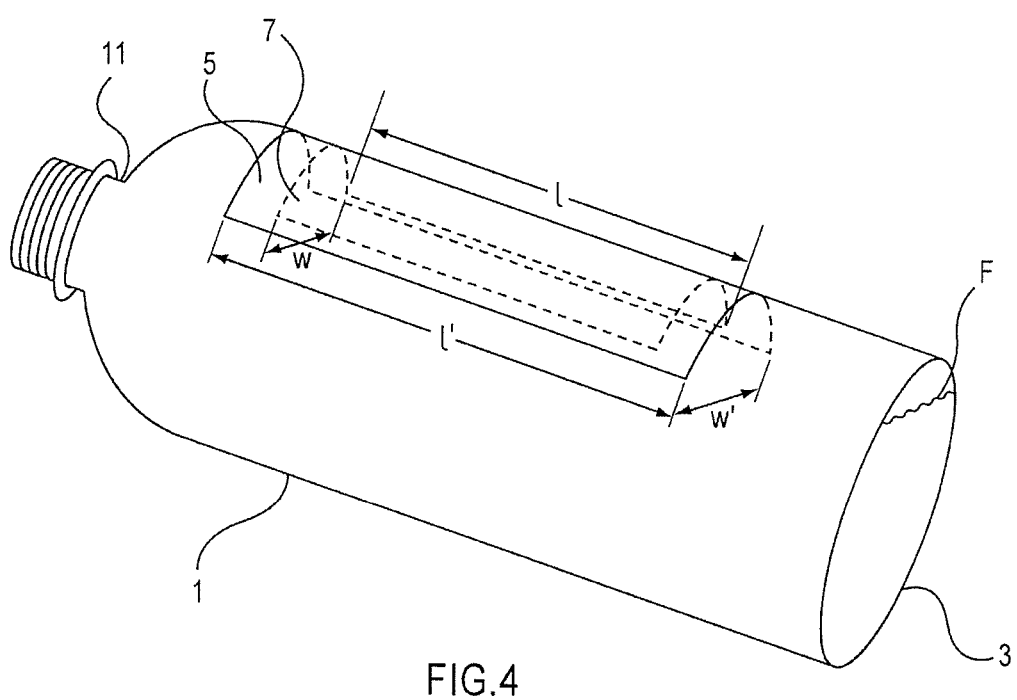
FIG. 4 illustrates an exemplary isometric view of a portable container having multiple openings in which a secondary aperture integrated in the longitudinal walls is covered by a cover, which has an area greater than that of the secondary aperture, in accordance with aspects of an embodiment of the present invention.

FIG. 4 illustrates a cover 5 that is attached to the longitudinal walls 4 over the secondary aperture 7 using an adhesive. The fill line F is shown on the base 3. As used herein, the term "adhesive" shall encompass substances which bind and/or adhere; such as epoxy, glue, rubber cement, and other known binders or shall generally be used to mean a chemical, mechanical, or natural property allowing two or more items to be held together. The adhesive may be applied directly to the longitudinal walls 4, to one side of the cover 5, or to both. The adhesive should allow the cover 5 to form a leak-proof seal with the longitudinal walls 4, while also allowing a user to manipulate the removal of the cover 5, preferably using the user's hands without a tool or other instrument.

Depending on the intended application, the adhesive may be selected such that the cover will provide a one-time use, or such that the cover can be resealed and the aperture may be accessed a plurality of times. Adhesives suitable for the present invention would be known to one skilled in the art and may be manufactured by 3M, Inc (Minneapolis, Minn.). Preferably, adhesives should be non-toxic and tasteless to the user, and should not affect or interact with the flavor, chemistry, or composition of the consumable beverage or food in the container.

Additional aspects in accordance with the present invention include a resealable cover. Among other sealing mechanisms, the cover may connect to the container using a threaded screw-on cover, a rotating sleeve having an opening, plastic locking technology, such as interlocking profile extrusions, which have been commonly used with plastic bags (see, e.g., Ziploc® manufactured by S.C. Johnson Brands WI, USA), protrusions on the cover that snap into, or rotate into corresponding notches on the container, a sliding sleeve, and adhesives may be used to allow the cover to be replaced over the aperture while remaining in position so as to prevent leaking of the contents of the container.

Resealing technology may be applicable with embodiments in which the cover has sufficient dimensions in relation to the aperture to attach to the circumference of the aperture. For example, the embodiment illustrated in FIG. 4 may include a cover 5 having a first interlocking profile extrusion that matingly corresponds to a second interlocking profile extrusion disposed on the longitudinal walls 4 of the bottle 1, preferably proximal to or along the circumference of the aperture 7.

In conventional bottles when laid horizontally, the distance from the neck to the horizontal resting plane of the bottle is smaller than the distance between the horizontal resting plane of the bottle and the longitudinal wall most distal to that plane. Accordingly, in preferred embodiments, the secondary aperture is substantially separate from the neck of the bottle.

Figure 5:
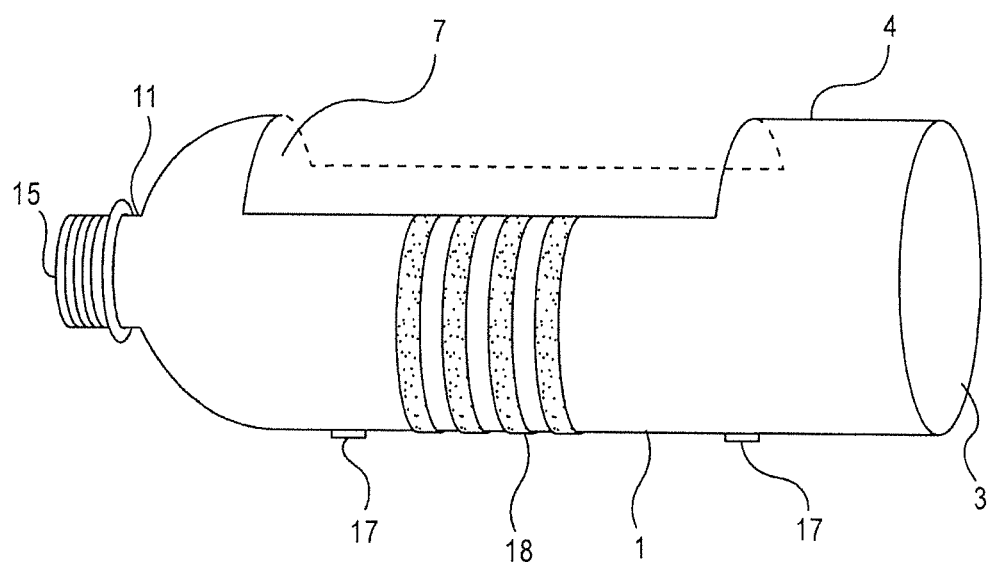
FIG. 5 illustrates an exemplary view of a portable container disposed with an uncovered secondary aperture integrated in the longitudinal walls and the substantially round cross-sectional container includes stabilizing and/or ornamental elements to ensure an accessible disposition of the secondary aperture, in accordance with aspects of an embodiment of the present invention.

Among other uses, the container of the present invention may have a dual purpose. The first purpose, as provided by the conventional first opening 15, as shown in FIG. 5, is to allow conventional drinking or pouring, namely through the conventional opening 15. The second purpose, as provided by the secondary aperture 7, allows lapping or licking of the contents of the container 1 by animals and/or access to the contents of the container 1 using a user's hands or utensils. When using the secondary aperture 7, it is preferable that the container 1, such as the bottle depicted in FIG. 5, be placed in a substantially horizontal position in which the longitudinal walls 4 are disposed parallel to the surface, and the base 3 is substantially orthogonal to the surface. In some embodiments, the secondary aperture 7 may be placed at the base 3, and in such embodiments the bottle 1 is preferable held or placed upside-down, with the conventional aperture 15 pointing downward. Additionally, the conventional aperture 15 may allow access to the container 1 from a substantially top position, as shown in FIG. 5. In certain embodiments, the secondary aperture 7 may provide access to the user and/or animal without rotation of the container 1 from a stable, horizontal position.

A circular, ovular, or substantially round cross-sectional shaped container may also be configured to be placed in stable horizontal position, eliminating or substantially reducing rolling of the container. As shown in the FIG. 5, the container 1 may include one or more stabilizing elements 17 and 18. The stabilizing elements 17 and 18 protrude or extend radially from the longitudinal walls 4 to provide anti-roll features to the container 1. Accordingly, the stabilizing elements 17 and 18 may be provided in various sizes depending on one or more of: the level of stability required, style and ornamentality, storage requirements, and other factors. In some embodiments the container 1 may include an ability to be manipulated, shaped, or "crushed" into a shape eliminating or substantially limiting the ability for the bottle 1 to roll and enhancing the stable, horizontal placement.

In certain embodiments, the bottle includes a designated or predetermined "crushable" portion such that the user may crush the container manually to create a substantially flat side and obtain a stable horizontal position. In some embodiments, the crushable portion may be comprised of more flexible or malleable material than other portions of the bottle. In some embodiments, due to the nature of the materials used for the bottle, the bottle can be manually crushed and manipulated into shapes, such as a shape having a substantially flat side on which to lay the bottle. In some embodiments, the stabilizing elements and the crushing technique may be used alone or in conjunction with one another.

Figure 6:
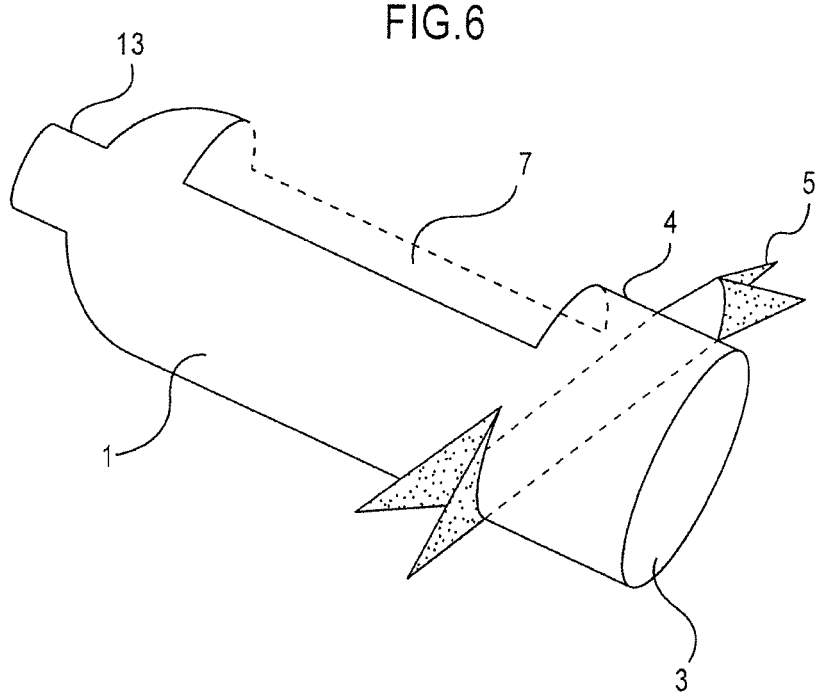
FIG. 6 illustrates an exemplary container having a secondary aperture formed in the longitudinal walls of the container that is stabilized in position by strategic placement of the removed cover, in accordance with aspects of an embodiment of the present invention.
Figure 6A:
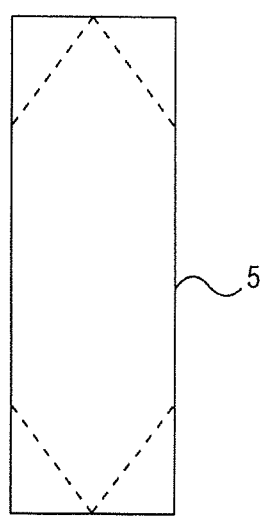
FIG. 6A illustrates an exemplary cover for a secondary aperture that can stabilize a horizontal position of the container along the scored markings, in accordance with aspects of an embodiment of the present invention.

Some variations of the present invention, as shown in FIG. 6, include a removable cover 5 that among other things may be manipulated into a structure to stabilize the horizontal position of the container 1. The cover 5, in a folded state is placed under the longitudinal walls 4 of the container 1 to prevent rolling of the container 1. FIG. 6A provides a top view of the cover 5 having scored markings for folding the cover 5 as a way to stabilize the bottle 1 in a horizontal position. In some embodiments, the scored markings are more than guidelines drawn or marked. That is, the scored markings may be imprinted or built-in to the bottle itself.

Figure 7A:
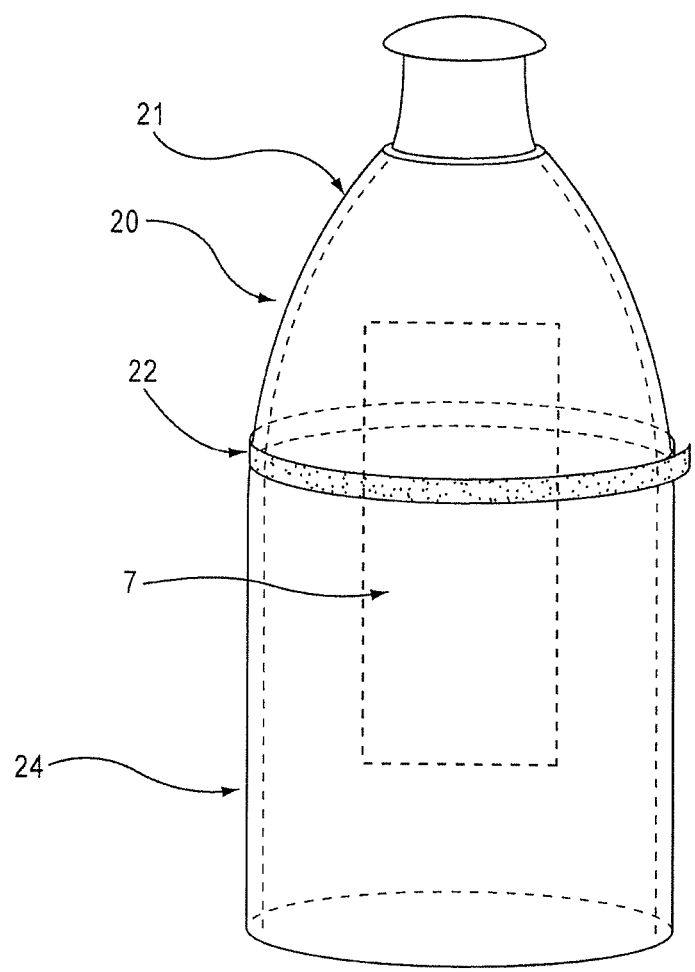
FIG. 7A illustrates a container including a removable outer sleeve (i.e., shell), in accordance with aspects of an embodiment of the present invention.
Figure 7B:
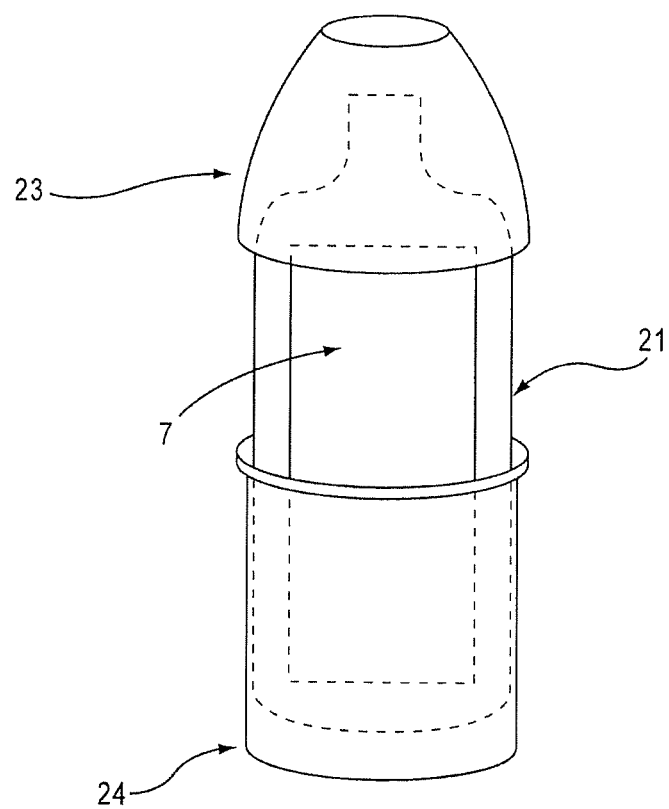
FIG. 7B illustrates an additional view of the container of FIG. 7B wherein the sleeve is semi-detached.

Aspects of the container may include portions of the container that are removed to provide access to the secondary aperture. Among other things, such portions may include a tab that pulls away to release the cover and/or a perforated section. FIGS. 7A and 7B illustrate embodiments incorporating further aspects of the present invention. The container 1 in FIG. 7A comprises an outer shell 20 surrounding an inner portion 21 having a removable portion 22, such as a rip tab. Although the removable portion 22 is shown in the center of the container, the removable portion 22 may be located at any location along the outer shell of the container. Once the removable portion 22 is separated from the outer shell 20, the outer shell 20 separates into an upper shell 23 and a lower shell 24. In some variations, the outer shell 20 plugs the aperture 7, such that when the outer shell 20 is removed, the aperture 7 is fully accessible.

As shown in FIG. 7B, the upper shell 23 may then be removed over the neck of the container 1, and the lower shell 24 may be removed from the base of the container. Access is provided to the aperture 7 by removing both portions of the outer shell 20. This embodiment may further include an additional cover 5 over the aperture 7 that is released by removing the outer shell, or the aperture 7 may be covered only by the outer shell 20. A rubber gasket may be provided between at least one of the upper 23 and lower 24 shells and the inner portion 21 of the container. Similarly, a gasket may be provided between any additional cover 5 and the sides 4 of the inner portion 21 of the container 1. The outer shell 20 may bias the cover 5 against the sides of the container surrounding the aperture 7.

Aspects may also include a cylindrical sleeve that biases a cover 5 against a gasket between the cover 5 and the sides 4 of the container surrounding the aperture 7, in a manner similar to the outer shell 20 in FIGS. 7A and 7B.

In one embodiment of the present invention, the container includes a lip member designed around the aperture. Preferably, the lip provides an edge that prevents accidental cuts. In preferred embodiments, the lip has rounded edges. In some variations, the lip provides a surface that is mateable with the surface of the cover. In certain inventions, the lip and cover are joined by friction, static, adhesive, or one or more mechanical devices, such as a bolt, rivet, snap, button, zipper, latch, or the like. In preferred inventions, the aperture is resealable by the cover.

The lip can be of any material that attaches to the walls of the container. In preferred embodiments, the container is the same as a similar material as the walls of the container.

Figure 10A:
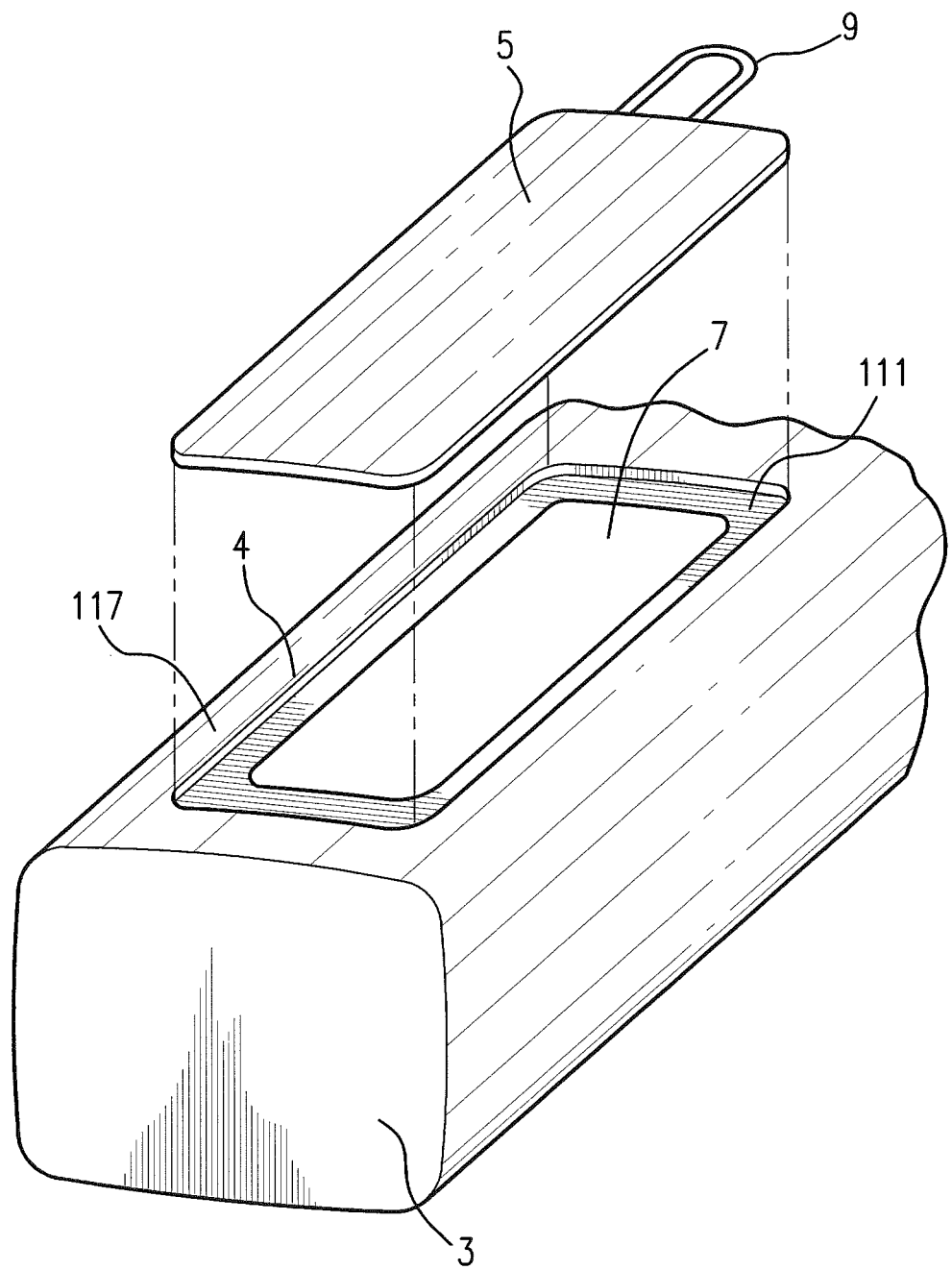
FIG. 10A illustrates an exemplary container having a removed cover that may connect to the container using a lip along the perimeter of the secondary aperture, in accordance with aspects of an embodiment of the present invention.

As shown in FIG. 10A, the lip 111, which provides an inner layer mating area, is preferably provided in a layer on the inside of the walls 4 of the container 1. The invention contemplates that the lip 111 may be attached to the outer layer 118 of the walls of the container 1. As shown in this embodiment, the cover 5 having a facilitator 9 is completely removable from the secondary aperture 7. When in place on the container 1, the cover 5 sits flush on the lip 111.

Figure 10B:
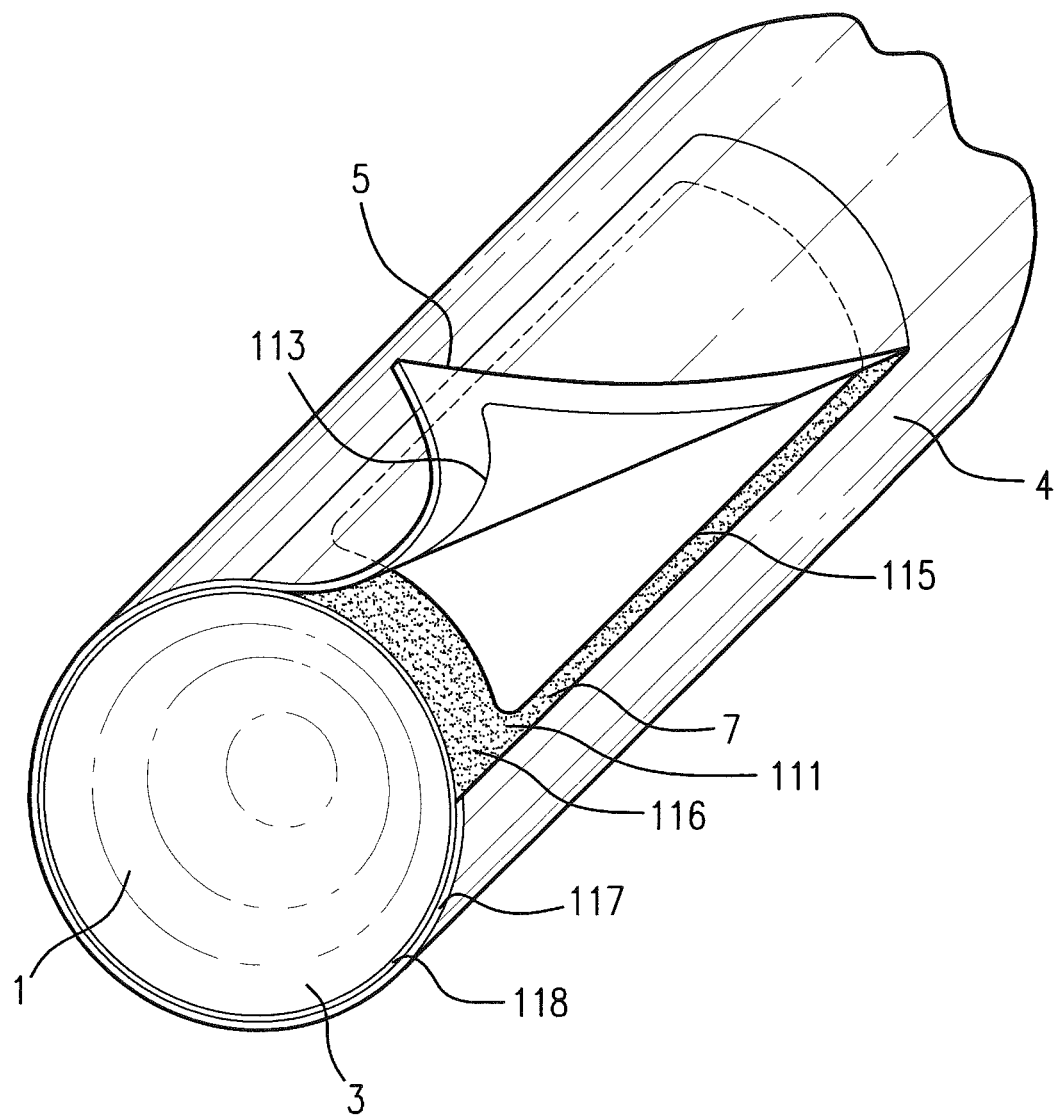
FIG. 10B illustrates an exemplary representation of a container having an aperture abutting the base of the container, a lip feature, and cover in a partially removed state, in accordance with aspects of an embodiment of the present invention.

In FIG. 10B, an exemplary bottle 1 includes an outer layer 117 and an inner layer 118 of walls 4. The inner layer 117 forms an inner layer mating area 111, which comes into contact with the cover 5 and the adhesive 116, when the cover 5 is in place on the bottle 1. The cover 5 includes a cover seal 113, which may be made of plastic or rubber and matingly fits against or in connection with the seal 115. Embodiments of this include a rubber gasket, a "zip-loc" or other zipper mechanism, or the like.

Figure 10C:
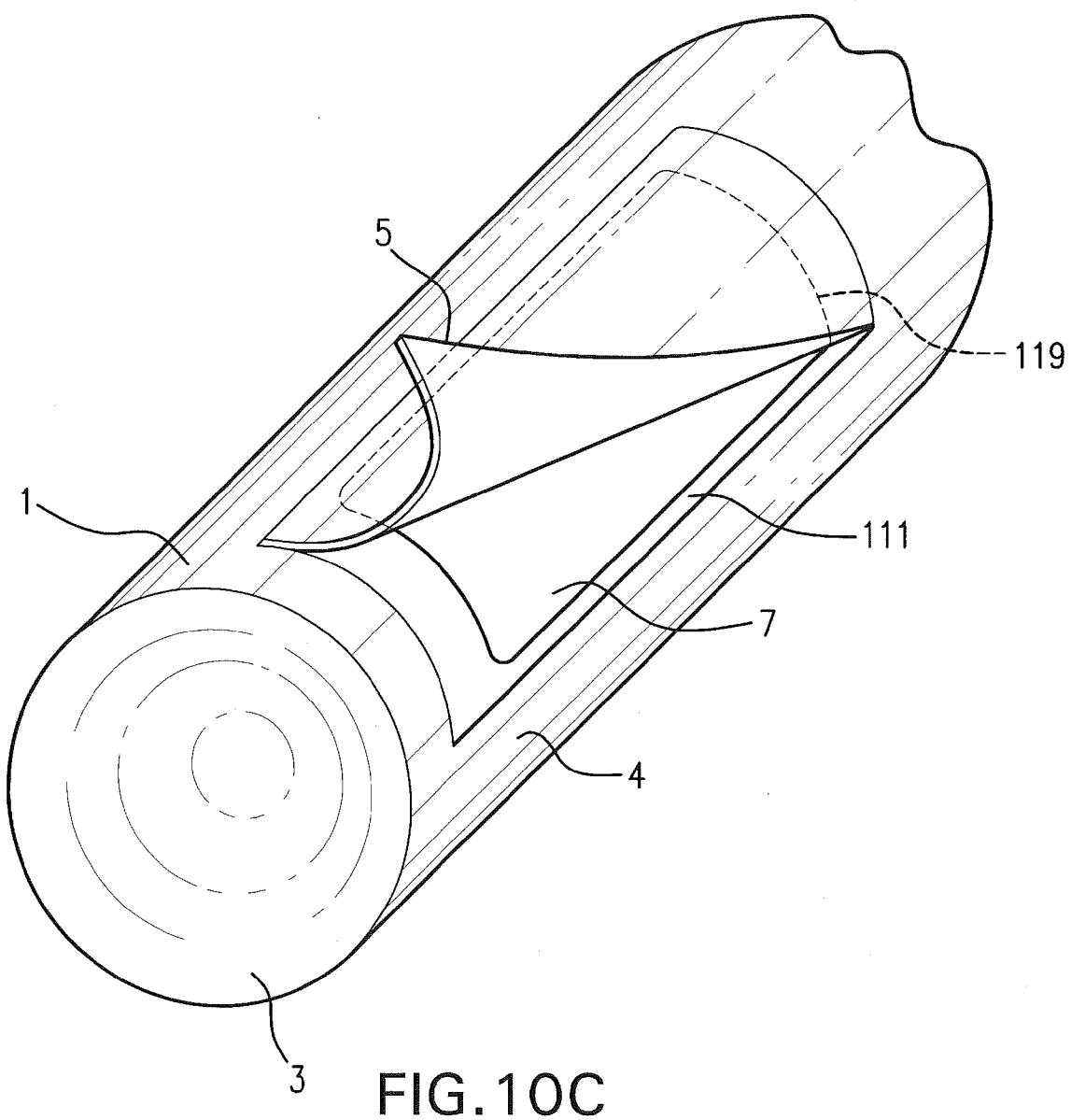
FIG. 10C illustrates an exemplary representation of a container having a partially removed cover adhesively affixed to a lip to integrate with the longitudinal walls of the container, in accordance with aspects of an embodiment of the present invention.

FIG. 10C shows an embodiment in which the cover 5 is a pliable, film-like material which is attached to a lip 111. The secondary aperture edge 119 forms the border of the aperture 7.

Figure 11:
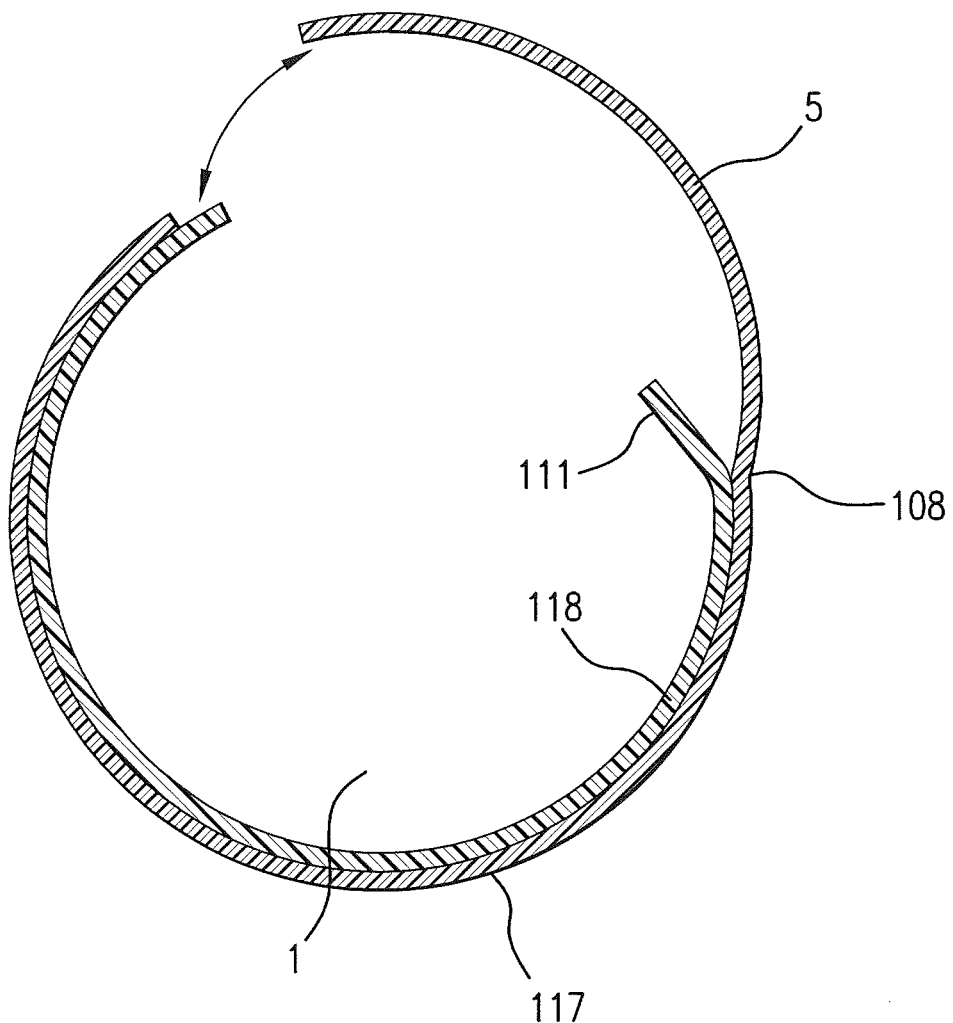
FIG. 11 a cross-sectional view of an exemplary container having a lip feature, in accordance with aspects of an embodiment of the present invention.

FIG. 11 shows a representation of a cross-section of the container 1 in which the lip 111 is attached to the inner layer of the walls 118 of the container 1. An outer layer of the wall 117 circumscribes the cross-section of the container 1, forming a hinged cover 5. The hinge 108 allows the cover 5 to open and close.

Figure 13:
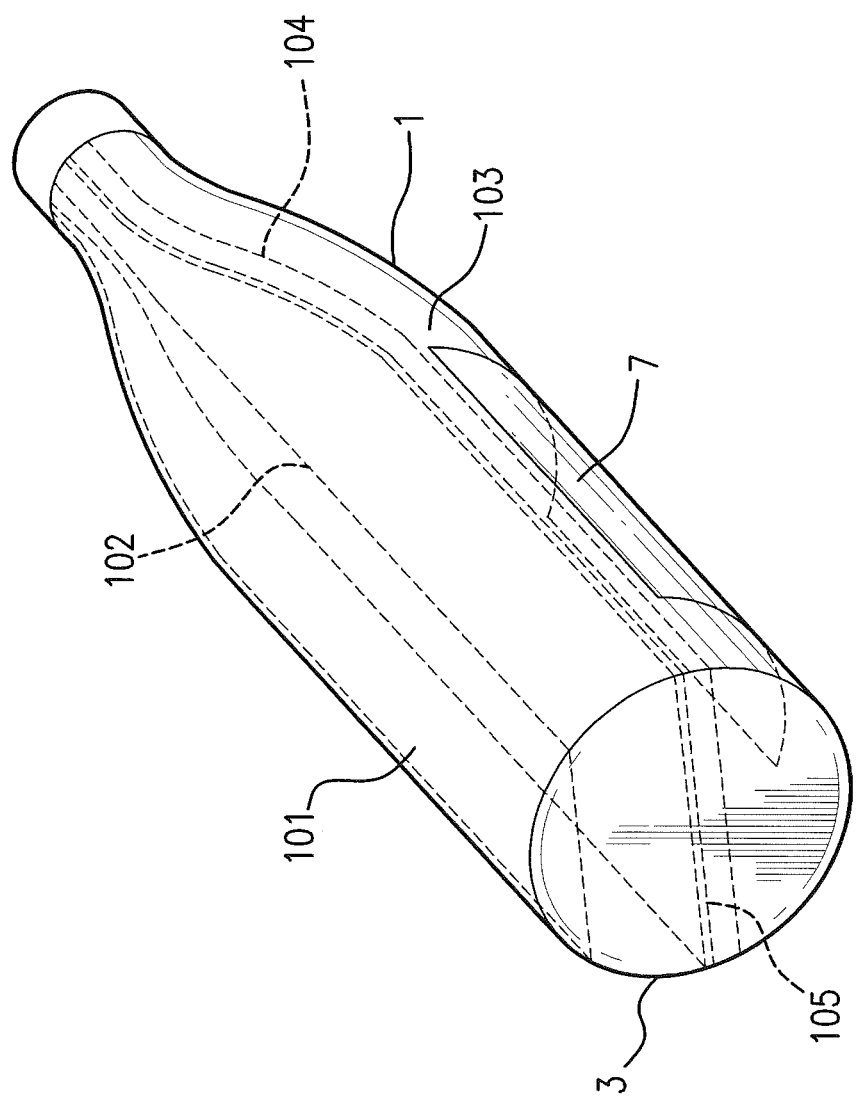
FIG. 13 illustrates another exemplary side-by-side, multi-chamber container having a first chamber and a second chamber with a secondary opening, in accordance with aspects of an embodiment of the present invention.

Some embodiments of the present invention provide multi-chamber container. The two chambers may be disposed side-by-side or one on top of another from the perspective of a bottle standing up. In side-by-side embodiments each side may include a top opening, a secondary opening, or both. In some embodiments, a side opening may access each of the chambers. In one variation each chamber or at least one chamber has a side aperture (i.e., secondary opening). FIG. 13 is an exemplary embodiment of dual-chamber bottle, in which the chambers are disposed side-by-side.

Figure 9A:
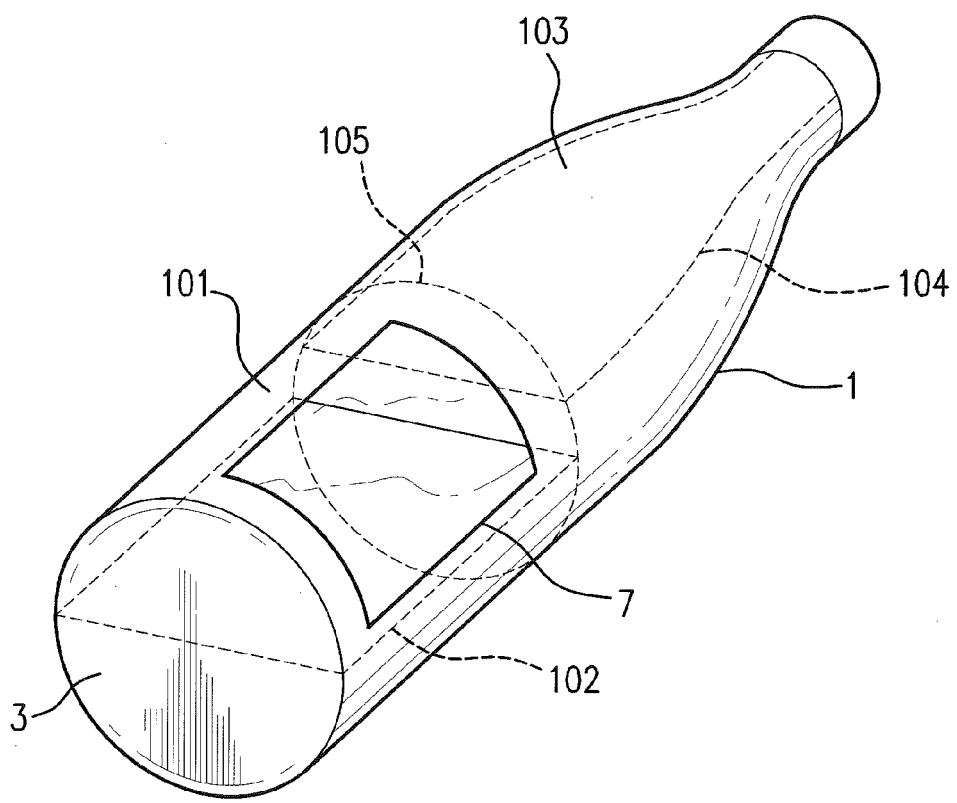
FIG. 9A illustrates an exemplary multi-chamber container having a first chamber and a second chamber integrated with a secondary opening, in accordance with aspects of an embodiment of the present invention.

In preferred variations, one chamber is accessible by the traditional bottle opening and the second chamber is accessible by the side aperture, as shown by example in FIG. 9A. Preferably, one chamber 101 holds a first beverage for drinking through the conventional aperture and second chamber 103 holding a second beverage for drinking through the secondary aperture 7. Additionally, in this exemplary embodiment, the bottle 1 includes a base 3 and longitudinal walls 4, forming a substantial circular, cross-sectional shape. In a first chamber 101, the fill level 102 of the liquid is preferably lower than the dimensions of the aperture 7 so as to avoid spilling of the contents. A second chamber 103 has fill level 104, which may differ from the fill level 102 in the first chamber 101. The first chamber 101 and second chamber 103 are separated by a separator chamber 105, which is preferably integrated into the bottle 1 at assembly. That is, the chambers 101 and 103 may be separated, thereby preferably preventing mixing of contents between chambers 101 and 103, unless equipped with a removable separator member 105.

In certain embodiments, the invention is provided in a reusable and refillable bottle. In such embodiments, the cover corresponding to the side aperture is preferably reattachable, such as by a locking, snapping, or other retaining member or mechanism.

Figure 9B:
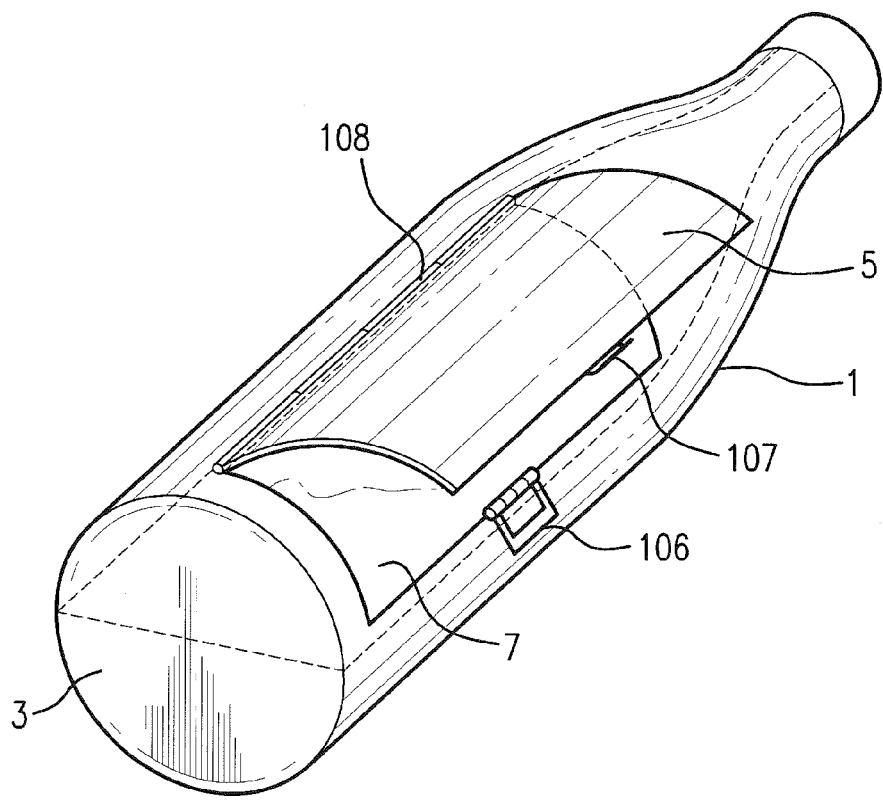
FIG. 9B, illustrates an exemplary container having a hinged cover and locking members to secure the cover in a stationary closed position, in accordance with aspects of an embodiment of the present invention.

As shown in FIG. 9B, the bottle 1 includes a cover 5 covering an aperture 7. The cover 5 is functionally connected to the bottle 1 using a hinge 108. The cover 5 may be kept in place with a locking member 106 attached to receiving member 107 preferably ensuring a tight, leak-proof fit.

The above described aspects of the present invention can be applied to containers of any size. Preferred sizes for dispensing fluids may include a size between a few milliliters and a few liters. Among other shapes, containers may be shaped similar to any standard water, soda, sport drink, and juice bottle.

The term "about," as used herein, should generally be understood to refer to both the corresponding number and a range of numbers.

While illustrative aspects in accordance with the present invention are disclosed herein, it will be appreciated that numerous modifications and other embodiments can be devised by those of ordinary skill in the art. The aspects described herein can be combined, separated, interchanged, and/or rearranged to generate other embodiments. Therefore, it will be understood that the appended claims are intended to cover all such modifications and embodiments that come within the spirit and scope of the present invention. Many variations and modifications will be apparent to those of ordinary skill in the art.

In some embodiments, the invention may be used interchangeably for liquids and semi-liquids, such as soups or gelatinous materials, for human consumption. The materials used may be optimized for heating and/or cooling.

In certain embodiments, the containers of this invention may include more than one chamber for beverages, preferably a first chamber for holding a first beverage for drinking through the conventional aperture (i.e., conventional mouthpiece) and a second chamber for holding a second beverage for consumption through the side aperture.

I claim:

1. A container for storing or delivering a liquid in a vertical or horizontal position, the container comprising:
    a base portion having a substantially circular cross-section with an integrated flat side;
    a surrounding wall connected to the base portion forming a hollow receptacle in which the liquid is capable of being retained in the container disposed horizontally on the flat side of the base portion;
    a top portion disposed at the end of the container opposite of the base portion having a first opening;
    a second opening formed in the surrounding wall on the side substantially opposite of the flat side;
        wherein the second opening is dimensioned to allow lapping access by an animal;
        wherein the second opening has an area larger than an area of the first opening;
        wherein the second opening is not formed in the base portion;
    and
    a removable cover configured to engage the container to close the second opening and retain the liquid within the receptacle;
        wherein the cover includes a rip tab and a perforated edge along a perimeter where the cover engages with the container.

2. A container for holding liquid therein, comprising:
    a base;
    walls formed with the base, shaping a hollow chamber as a receptacle for a liquid;
    a first opening disposed at a distal end of the base, allowing direct access to the hollow chamber;
    a second opening formed in the walls, allowing direct access to the hollow chamber, wherein the secondary opening has a larger area than the first opening to allow lapping of the liquid contents therein by an animal and wherein the second opening is in the same plane as the walls;
    a removable cover so dimensioned to fit over the secondary opening to prevent spilling of the liquid from the chamber;
        wherein the cover is alternately positionable from a first sealed position to a second unsealed position; and
        wherein the cover is substantially flush with the surrounding walls and is integrated in the surrounding walls when in the first position; and
    a graspable facilitator disposed on the cover to allow for manual positioning of the cover from the first sealed position to the second unsealed position.

3. The container of claim 2, further comprising:
    a hinge disposed between the cover and the walls, the hinge allowing the cover to be positionable from a first position to a second position; and
    a gasket positioned between the second opening and the cover to form a waterproof seal when the cover is in the first position.

4. The container of claim 3, further comprising:
    a locking member disposed on the surrounding walls;
    a receiving member disposed on the cover to receive the locking member to retain the cover in the first sealed position.

5. The container of claim 2, wherein the facilitator is fixed to an outer surface of the cover.

6. The container of claim 2, wherein the facilitator is graspable.

7. The container of claim 2, wherein the facilitator projects radially from an outer surface of the cover in the first sealed position.

8. The container of claim 2, wherein the container comprises one hollow chamber, allowing the liquid therein to flow unobstructed in the hollow chamber.

9. A container for storing or delivering a liquid, the container comprising:
    a base portion;
    a surrounding wall, connected to the base portion and disposed perpendicular to the base portion, shaping a hollow chamber suitable for holding the liquid, wherein the surrounding wall is comprised of at least two layers,
        an outer layer disposed the outside surface of the container; and
        an inner layer in immediate contact with the inside surface of the outer layer;
    a first opening formed from the surrounding wall disposed at an end of the hollow chamber distal to the base portion formed;
    a second opening formed in the surrounding wall accessing the hollow chamber and disposed between the base portion and first opening;
    wherein an area of the second opening formed in the outer layer is greater than the area of the first opening;
    wherein the area of the second opening formed in the inner layer is greater than the area of the first opening and smaller than the area of the second opening in the outer layer,
    a lip disposed along at least two opposite sides of the perimeter of the second opening formed from the surrounding wall wherein the area of the second opening formed in the inner layer is smaller than the area of the second opening in the outer layer;
    a removable cover, wherein the cover is matingly attachable to the lip to form a hermetic seal of the second opening and to be positioned with its outer surface flush with the outer surface of the outer layer of the surrounding wall.

10. The container according to claim 9, wherein the area of the lip circumscribes the perimeter of the second opening.

11. The container of claim 9, wherein the cover further comprises:
    a gasket, positioned between the cover and the lip to provide a hermetic seal between the surrounding walls and the cover.

12. The container of claim 9, wherein the cover further comprises:
    an adhesive disposed on a side of the cover contacting the lip, allowing the cover to be positioned over the secondary opening to seal the contents of the container.

13. The container according to claim 9, further comprising:
    a plurality of at least partial perforations formed along a circumference of the cover, forming weakened portions of a bond between the cover and the outer layer of the surrounding wall.

14. The container according to claim 9, further comprising:
    one or more support elements disposable on the surrounding wall on a side of the surrounding wall substantially opposite of the second opening, whereby the one or more supporting elements stabilize the container to position the second opening in a substantially upwards position.

15. The container according to claim 14, wherein the support element is the cover.

16. The container according to claim 9, wherein the cover further comprises:

a manipulable tab connected to the cover to allow the cover to be removed.

17. The container of claim 16, wherein the second opening has an area that is between about 4 to 50 times larger than the area of the first opening.

18. The container of claim 9, wherein the second opening has an area that is between about 2 to 200 times larger than the area of the first opening.

19. The container of claim 9, wherein the cover is comprised of substantially the same material as the surrounding wall.

20. The container of claim 9, wherein the cover is flush with the outer surface of the surrounding wall when positioned sealably on the lip.

21. The container of claim 9, wherein the surrounding wall with the second opening creates a semi-enclosed chamber.

22. The container of claim 9, wherein the cover is made of the same material as the surrounding wall.

23. A container for storing or delivering a liquid, the container comprising:
- a base portion;
- a surrounding wall, connected to the base portion and disposed perpendicular to the base portion, shaping a hollow chamber suitable for holding the liquid, wherein the surrounding wall consists of two layers,
  - an outer layer disposed the outside surface of the container; and
  - an inner layer in immediate contact with the inside surface of the outer layer;
- a first opening formed from the surrounding wall disposed at an end of the hollow chamber distal to the base portion formed;
- a second opening formed in the surrounding wall accessing the hollow chamber and disposed between the base portion and first opening;
  - wherein an area of the second opening formed in the outer layer is greater than the area of the first opening;
  - wherein the area of the second opening formed in the inner layer is greater than the area of the first opening and smaller than the area of the second opening in the outer layer,
- a lip disposed along at least two opposite sides of the perimeter of the second opening formed from the surrounding wall where the area of the second opening formed in the inner layer is smaller than the area of the second opening in the outer layer;
- a removable cover, wherein the cover is matingly attachable to the lip to form a hermetic seal of the second opening and to be positioned with its outer surface flush with the outer surface of the outer layer of the surrounding wall.

24. The container of claim 23, further comprising:
a graspable facilitator projecting radially from an outer surface of the cover.

* * * * *